United States Patent
Di Croce

[11] Patent Number: 5,838,255
[45] Date of Patent: Nov. 17, 1998

[54] ENHANCED REMOTE CONTROL DEVICE

[75] Inventor: John Di Croce, Hauppauge, N.Y.

[73] Assignee: Audiovox Corp., Hauppauge, N.Y.

[21] Appl. No.: 634,975

[22] Filed: Apr. 19, 1996

[51] Int. Cl.[6] .............................. G08C 19/00; B60R 25/04
[52] U.S. Cl. ................................ 340/825.69; 340/825.72; 307/10.3
[58] Field of Search .................... 340/825.69, 825.72, 340/825.22; 307/10.3

[56] References Cited

U.S. PATENT DOCUMENTS

| | | | |
|---|---|---|---|
| 4,706,121 | 11/1987 | Young | 340/825.22 |
| 4,807,052 | 2/1989 | Amano | 340/825.72 |
| 4,841,368 | 6/1989 | Rumbolt et al. | 340/825.69 |
| 5,081,534 | 1/1992 | Geiger et al. | 340/825.69 |
| 5,146,215 | 9/1992 | Drori | 340/825.72 |
| 5,307,193 | 4/1994 | VanZeeland et al. | 340/825.69 |
| 5,561,331 | 10/1996 | Suyama et al. | 307/10.3 |
| 5,627,529 | 5/1997 | Duckworth et al. | 340/825.69 |

*Primary Examiner*—Brian Zimmerman
*Assistant Examiner*—Edward Merz
*Attorney, Agent, or Firm*—Morrison Law Firm

[57] ABSTRACT

An enhanced vehicle remote control system adds a new transmitter and a new receiver to an original remote control system. The new receiver is connected for direct operation of the original transmitter which is permanently installed in the vehicle. In response to signals from the original transmitter, the unmodified original receiver controls the same functions in the same way as before. The new receiver is also connected to control functions in the vehicle which were not controlled by the original remote control system.

6 Claims, 2 Drawing Sheets

ENHANCED REMOTE CONTROL DEVICE

BACKGROUND OF THE INVENTION

This present invention relates to vehicle remote control systems and, more particularly, an after-market system for adding additional functions to an existing factory installed vehicle remote control system, and for increasing range and the number and types of functions that the system is capable of performing.

Vehicle manufacturers install remote keyless entry units and/or remote alarm systems on many vehicles. The options and features of these systems are predefined by the vehicle manufacturer. Thus, the remote systems may offer only basic control of vehicle door locks, trunk release and panic sounding of the horn upon remote RF or IR command.

Consumers may desire additional convenient features than those currently offered by the vehicle manufacturer. Once a consumer has acquired a vehicle, there is little opportunity to increase the functions that can be performed. These functions include, but are not limited to, remote starting, power window control and garage door operation. Because such additional features may not be available from the vehicle manufacturers, a way is necessary to increase the capabilities of vehicle factory installed systems.

A number of companies attempt to meet this demand with a separate system, including a separate transmitter, receiver and affecter for producing an output which directly controls a function such as, for example, a remote starting function. In the alternative, some after-market suppliers decode a sequence of commands generated by the existing factory-installed system to control a function not contemplated by the vehicle manufacturer. For example, existing devices such as the Audiovox AS-9231, provide an output when the manufacturer-installed remote transmitter buttons are pressed in a particular sequence. For example, if the lock button is pressed, followed by the unlock button and then the lock button again within a certain period of time, the device generates a pulsed output which can be used to activate an after-market device that provides an additional feature such as a remote car starter or a power window up/down control.

There are a number of drawbacks to devices that connect to the factory installed wiring and operate from the vehicle manufacturers' remote transmitter units. The devices are limited to the range of the RF section of the system originally installed in the vehicle, particularly the typically weak transmission capability of hand-held RF transmitters. A manufacturer-installed remote transmitter typically operates the factory installed system up to maximum distance of 100 feet from the vehicle. A consumer living in an apartment building or condominium, whose vehicle is parked beyond the effective range of the remote transmitter finds all of the remote controls ineffective since the range exceeds the operating range of the manufacturer-installed system. This is particularly true for the remote start function which the user prefers to operate before leaving his or her own premises.

Another drawback is the way in which the additional outputs controlling the added after-market devices are accessed by the factory installed remote transmitter. Because there are many button sequences possible with the original manufacturer's remote transmitter, many outputs can be generated. For example, pressing the sequence lock, unlock and lock generates a first output such as, for example, an engine start. Similarly, pressing the sequence unlock, lock and unlock generates a second, different, output such as, for example, power window down. This can be very confusing to the consumer since the consumer must remember which sequence generates the desired output from the after-market device. A consumer who activates what is intended to be a window-control sequence, and sees that the vehicle's engine has been started, receives a surprise, to say the least. Consumers easily forget the various sequences required for the desired outputs.

Another drawback of these devices is the possibility that an output can be generated by sequencing the vehicle's lock switches since all the after-market units must be connected to the vehicle's lock/unlock wires. An accident is very likely to occur with this installation. For example, if the vehicle has a remote car starter installed which is controllable through the vehicle's lock/unlock circuit by sequencing the remote transmitter buttons, it is possible for a child playing in the vehicle in a closed garage to activate the car starter by locking and unlocking the vehicle's doors. The resulting concentration of carbon monoxide gas in the garage poses a great threat to human life.

An additional drawback of the after-market devices is their cost and redundancy. These devices have a high installation cost. Also, many aftermarket devices, in addition to providing output capability, include a security system. The security system operates in parallel to the original system and duplicates its security features.

OBJECTS AND SUMMARY OF THE INVENTION

Accordingly, an object of the present invention is to provide a remote control system which overcomes the drawbacks and limitations of the prior art.

Another object of the present invention is to provide a new high gain receiver that operates an existing factory installed remote transmitter in order to control all original system functions.

Another object of the present invention is to provide additional driver outputs to control optional devices a consumer may wish to add to the existing system.

A still further object of the present invention is to prevent access to the optional devices from the vehicle's lock/unlock door switches.

A still further object of the present invention is to provide a low-cost remote control system which adds functions while enabling use of all the functions of an existing remote control system without duplicating its features.

A still further object of the present invention is to provide an easily installable remote control system which is user-friendly in operation and programming.

Briefly stated, the present invention provides an enhanced vehicle remote control system which adds a new transmitter and a new receiver to an original remote control system. The new receiver is connected for direct operation of the original transmitter which is permanently installed in the vehicle. In response to signals from the original transmitter, the unmodified original receiver controls the same functions in the same way as before. The new receiver is also connected to control functions in the vehicle which were not controlled by the original remote control system.

According to an embodiment of the invention, there is provided a remote control system comprising: an original remote control system, the original remote control system including an original transmitter and an original receiver, the original receiver being connected to enable at least a first function in response to first signals from the original transmitter, a new transmitter, a new receiver, the new receiver including means for producing second and third signals in response to the new transmitter, means for operating the original transmitter to produce the first signals in response to second signals from the new receiver, whereby the original receiver is operated to enable the at least a first function, and means for enabling at least a second function, not enabled by the original receiver, in response to the third signal, whereby the ability to enable the second function is added to functions of the original remote control system.

According to a feature of the invention, there is provided an enhancement to an original remote control system, wherein the original remote control system includes an original transmitter and an original receiver, with the original receiver being connected to perform at least a first function in response to reception of a first signal from the original transmitter, comprising: a new receiver, a new transmitter effective for communicating with the new receiver, first means associated with the new receiver for controlling the original transmitter to enable performance of the at least a first function, and second means associated with the new receiver for performing at least a second function not performed by the original remote control system.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
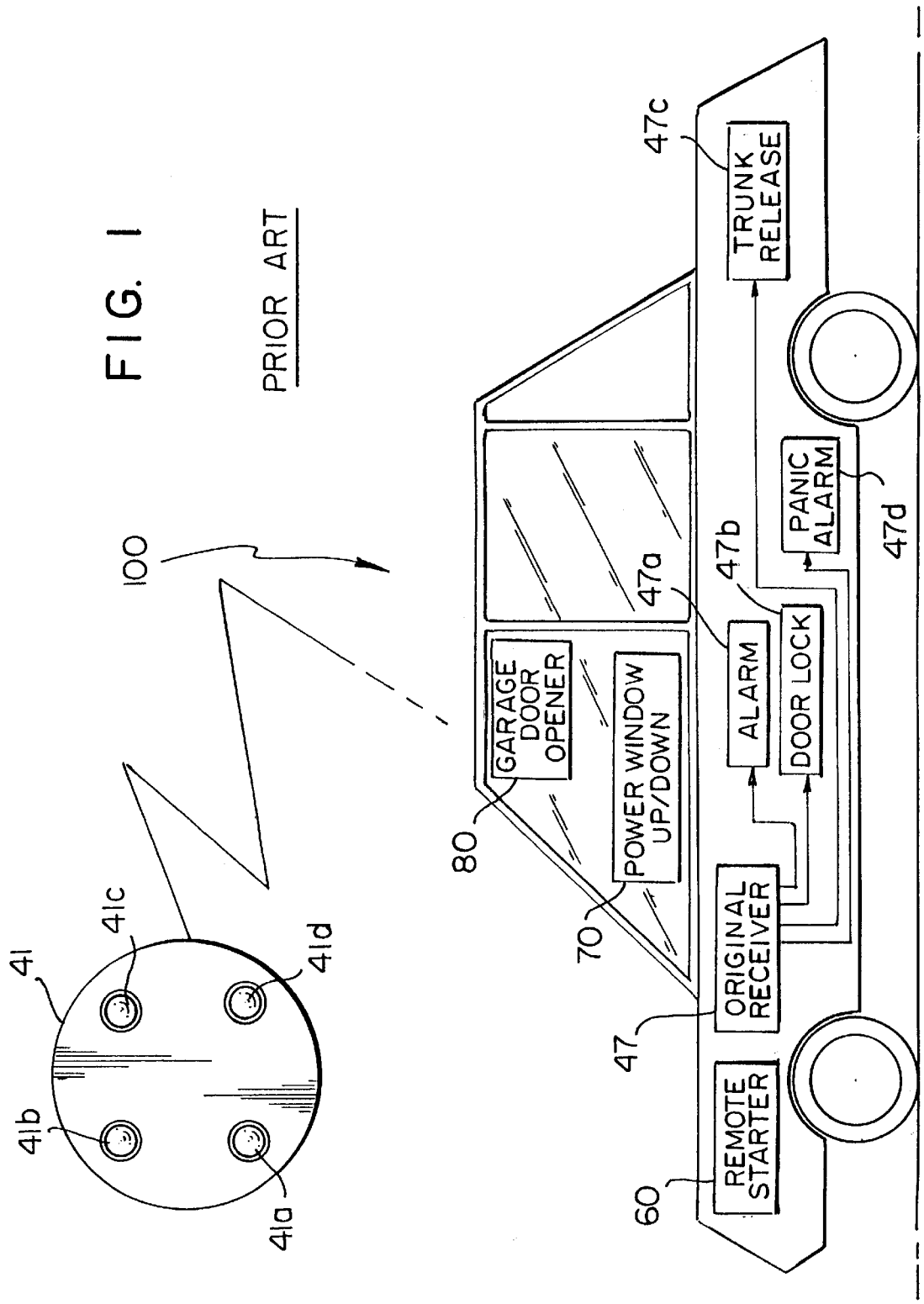
FIG. 1 is a simplified schematic diagram showing a vehicle having installed therein an original factory installed remote control system and additional devices for which the user may wish to add remote control.

Referring to FIG. 1, a vehicle 100 has an original receiver 47 installed in it. An original transmitter 41 includes an alarm button 41a, a door lock button 41b, a trunk release button 41c and a panic button 41d, all accessible for actuation by a user. An output signal (not shown), generated when one of the buttons on original transmitter 41 is pressed, is transmitted to original receiver 47. In response to the output signal it receives, original receiver 47 transmits one or more appropriate control signals to an alarm module 47a, a door lock module 47b, a trunk release module 47c or a panic alarm module 47d.

Additional devices are also installed in vehicle 100. These may include, for example, a remote car starter device 60, a power window up/down module 70 and a garage door opener controller 80. As noted in the background description, integrating such after-market devices into the normal systems of vehicle 100 presents a number of problems.

Figure 2:
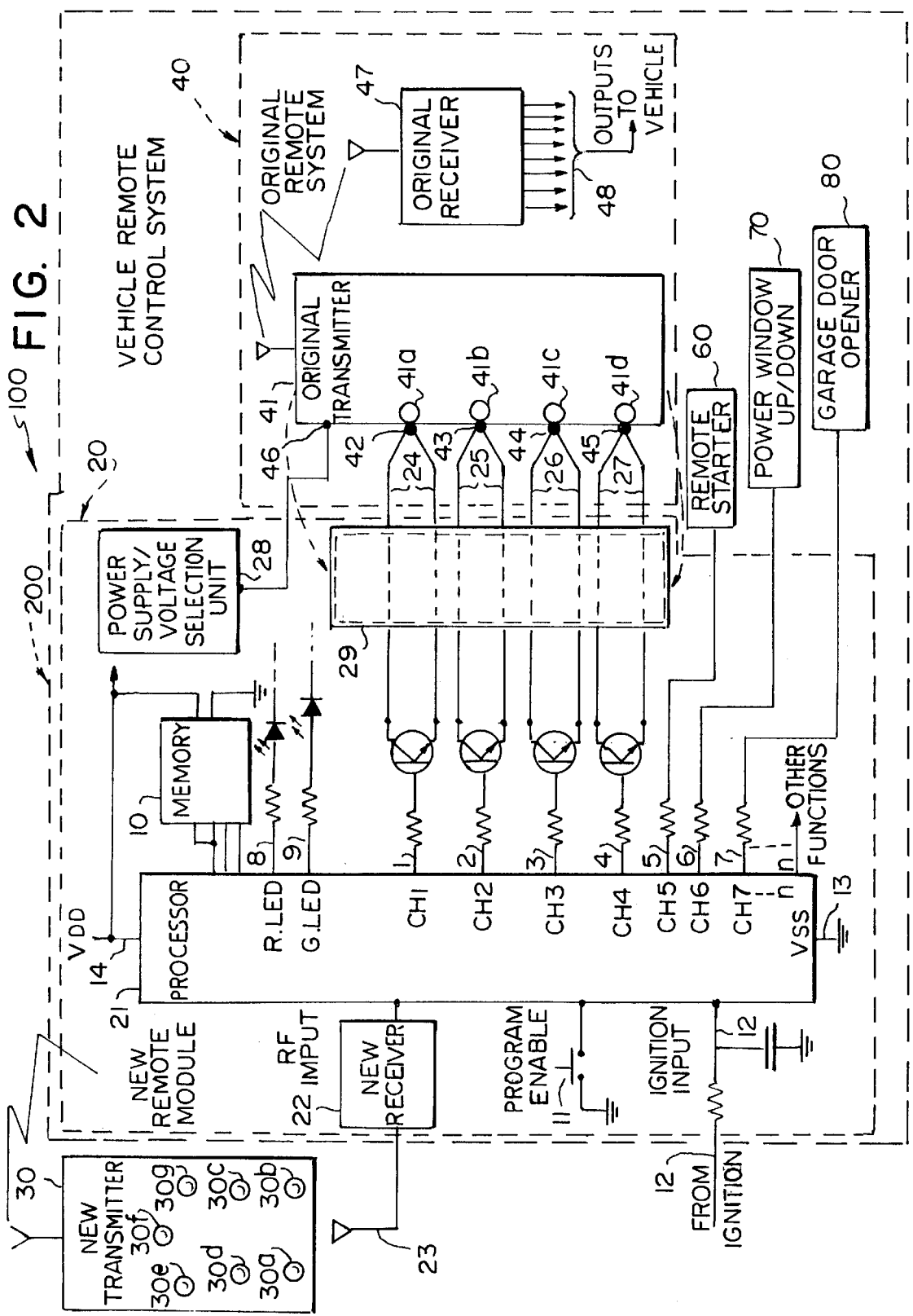
FIG. 2 shows a block diagram of a remote control system according to an embodiment of the present invention.

Referring to FIG. 2, a vehicle remote control system, shown generally at 200, includes a new remote module 20 in vehicle 100. A new transmitter 30 is carried by a user for remote control of functions in vehicle 100. New transmitter 30 has several switches in accessible locations (seven switches 30a, 30b, 30c, 30d, 30e, 30f and 30g are shown for example). New transmitter 30 and new remote module 20 control all the functions of original remote system 40, as well as additional functions, as will be described.

Original transmitter 41 is permanently mounted in vehicle 100, permanently connected to new remote module 20. The connection may be electrical, optical or physical. In the preferred embodiment, new remote module 20 includes a cavity 29 in which original transmitter 41 is physically mounted. Original transmitter 41 has its original number of buttons (four buttons are shown as an example). Original receiver 47 remains unmodified in its original location in vehicle 100. Original receiver 47 generates multiple outputs 48 that control manufacturer installed devices in the vehicle (not shown) in exactly the same manner, using the same wiring, as in the unmodified system.

New transmitter 30 contains as many switches (seven switches are shown as an example) as are necessary to control all the functions of original remote system 40 plus additional switches to control desired features a consumer may choose to add such as a remote car starter device 60, power window up/down module 70 and garage door opener controller 80. Each switch 30a, 30b, 30c, 30d, 30e, 30f and 30g of new transmitter 30 may be used to perform a single function. Each switch 30a, 30b, 30c, 30d, 30e, 30f and 30g may also be used in an actuation sequence or in combination with itself or one or more other switches to perform a function.

In the example embodiment, new transmitter 30 contains seven switches 30a, 30b, 30c, 30d, 30e, 30f and 30g, all accessible to the user. Switches 30a, 30b, 30c and 30d control respective buttons 41a, 41b, 41c and 41d of original transmitter 41. In response to actuation of original transmitter 41, original remote system 40 controls its same functions in a manner identical to operation before modification. Switches 30e, 30f and 30g control remote car starter device 60, power window up/down module 70 and garage door opener controller 80 respectively.

New remote module 20 includes a high gain new receiver 22. New receiver 22 receives seven coded signals, in response to actuation of ones of the seven switches 30a, 30b, 30c, 30d, 30e, 30f and 30g, from new transmitter 30. A processor 21 with memory 10 generates channel outputs 1, 2, 3, 4, 5, 6, 7 (although up to n channel outputs are possible) in response to inputs from new receiver 22. New receiver 22 connects to an antenna 23 which may be, for example, the same as in the original system. Antenna 23 may be a glass mount or a whip but, is not limited to any particular type.

Original factory transmitter 41 is connected to new remote module 20 as shown in FIG. 2. Original factory transmitter 41 is placed in cavity 29. A case (not shown) of original factory transmitter 41 to connect it to a power supply/voltage selection unit 28 contained in new remote module 20. Power supply/voltage selection unit 28 replaces the original transmitter's batteries (not shown). The output of power supply/voltage selection unit 28 is set to the voltage requirement of original transmitter 41 by moving a jumper (not shown) to produce 3, 6, 9 or 12 volts (or other voltage).

Wire pair one 24 is connected to alarm button 41a switch means contact area 42 of original transmitter 41. Wire pair two 25 is connected to door lock button 41b switch means contact area 43 of original transmitter 41. Wire pair three 26 is connected to trunk release button 41c switch means contact area 44 of original transmitter 41. Wire pair four 27 is connected to panic alarm button 41d switch means contact area 45 of original transmitter 41.

If original transmitter 41 has more than four buttons, this process is continued until all available buttons are connected to wire pairs in new remote module 20. Switch points (not shown) of wire pairs 24, 25, 26 and 27 assume control and operation of alarm button switch means contact area 42, door lock button switch means contact area 43, trunk release button switch means contact area 44 and panic alarm button switch means contact area 45.

New remote module 20 is installed in the vehicle (not shown) and connected to the vehicle's power supply source (VSS) 13, ground. An ignition input 12 is applied to processor 21.

New receiver 22 is placed in a program mode by closure of a program enable button 11. In the program mode, processor 21 stores commands received, and learns the responses required. New transmitter 30 transmits it commands in one or more 36-bit words in the 435 MHz band. Modulation can be of any convenient type but, in the preferred embodiment, pulse code modulation with code hopping is used.

A red LED 8 and a green LED 9 indicate programming status, as will be described. The program mode allows a channel of new transmitter 30 to be coded into a particular receiver slot (not shown) of new receiver 22. Each receiver slot, through channel outputs 1, 2, 3 and 4 controls wire pairs 24, 25, 26 and 27 connected to switch means contact areas 42, 43, 44 and 45 and additional channel outputs 5, 6, and 7 of new remote module 20, connected to remote car starter device 60, power window up/down module 70 and garage door opener controller 80.

The receiver program mode allows a programmer to select, individually, the mode of operation of additional channel outputs 5, 6 and 7. The modes of operation can be pulsed output or latched output selectable and inhibited or non-inhibited while ignition input 12 is high selectable.

Although the program modes have been described as a preferred embodiment, it is noted that these modes are not limited and can take any form necessary to perform a particular function or selection. Up to three transmitters per receiver slot (not shown) can be used. For a large number of transmitters, increased memory 10 in processor 21 may be required.

The following is a demonstration of how the program mode operates. In this example, original transmitter 41 has alarm button 41a, door lock button 41b, trunk release button 41c and panic alarm button 41d controlling respective switch means contact areas 42, 43, 44 and 45. Also, remote car starter device 60, power window up/down module 70 and garage door opener controller 80 are to be controlled by new transmitter 30. New transmitter 30 has seven switches 30a, 30b, 30c, 30d, 30e, 30f and 30g.

The programmer turns the vehicle ignition switch (not shown) to the on position. The programmer presses and releases program enable button 11 three times. Red LED 8 flashes once indicating that channel one of new receiver 22 is ready for learning. Next, the programmer presses and holds switch 30a of new transmitter 30 for three seconds. Red LED 8 turns on for 500 ms indicating that button 30a has been learned. This process is repeated for each additional transmitter (not shown) that the programmer desires to program into channel one of new receiver 22.

The programmer then presses and releases program enable button 11 one time to advance new receiver 22 to channel two. Red LED 8 flashes twice indicating that channel two is ready for programming. The same process as above is then repeated for new transmitter 30 and each additional transmitter that the programmer desires to program into channel two of new receiver 22. Channels three through seven are programmed in the same way.

To access and program the additional channel outputs 5, 6 and 7, the following procedure is used. The programmer turns the ignition switch (not shown) to the on position. The programmer presses and holds program enable button 11 for three seconds. Green LED 9 flashes three times indicating the program mode has been entered.

Next, the programmer presses and releases program enable button 11 once. Two selections are possible at this point. The pre-programmed switch 30a of new transmitter 30 is used to toggle between the selections. For one selection, green LED 9 remains on, indicating that new receiver's is channel 5 will provide a pulsed channel output 5. For the other selection, green LED 9 is off, indicating that new receiver's channel 5 will provide a switched channel output 5.

The programmer then presses and releases program enable button 11 once again. Two selections toggled by the pre-programmed switch 30a of new transmitter 30 are also are possible at this point. A lit green LED 9 indicates that new receiver's channel 5 is inoperable with ignition switch input 12 high. An unlit green LED 9 indicates that new receiver's channel 5 is operable with ignition switch input 12 high.

The programmer then presses and releases program enable button 11 once again. Two selections toggled by the pre-programmed switch 30a of new transmitter 30 are also are possible at this point. A lit green LED 9 indicates that new receiver's channel 6 will provide a pulsed channel output 6. An unlit green LED 9 indicates that new receiver's channel 6 will provide a switched channel output 6.

The programmer then presses and releases program enable button 11 once again. Two selections toggled by the pre-programmed switch 30a of new transmitter 30 are also are possible at this point. A lit green LED 9 indicates that new receiver's channel 7 is inoperable with ignition input 12 high. An unlit green LED 9 indicates that new receiver's channel 7 is operable with ignition input 12 high.

More than fifteen seconds of inactivity during any period will cause new remote module 20 to exit the program mode. Turning the ignition switch (not shown) off during any period will also cause new remote module 20 to exit the program mode.

Although seven channels are described above, any convenient number of channels possible. Any combination of pulsed and switched channel outputs and ignition enabled and disabled channel outputs is possible. The number of channel outputs is limited only by the number of switches available on new transmitter 30 and the capacity of system memory 10 in new remote module 20.

Also, if original transmitter 41 had only one button (not shown), but many possible sequences, it is still possible to operate new remote module 20 in its original manner by pressing switch 30a in the same sequence to control original remote system 40. This is possible because the operation of original transmitter 41 and original remote system 40 remains unchanged.

Having described preferred embodiments of the present invention with reference to the accompanying drawings, it is to be understood that the present invention is not limited to the precise embodiments, and that various changes and modifications maybe effected therein by one skilled in the art without departing from the scope or spirit of the present invention which is limited only by the appended claims.

What is claimed is:

1. A remote control system comprising:

an original remote control system;

said original remote control system including an original transmitter and an original receiver;

said original receiver being connected to enable at least a first function in response to first signals from said original transmitter;

a new transmitter;

a new receiver;

said new receiver including means for producing second and third signals in response to said new transmitter;

means for operating said original transmitter to produce said first signals in response to second signals from said new receiver, whereby said original receiver is operated to enable said at least a first function; and means for enabling at least a second function, not enabled by said original receiver, in response to said third signal, whereby the ability to enable said second function is added to functions of said original remote control system.

2. A remote control system according to claim 1, further comprising:

means for mounting said original transmitter in fixed relationship to said new receiver in a vehicle;

said original receiver being mounted in said vehicle;

said new transmitter being portable; and said new receiver being responsive only to signals from said new transmitter;

said original receiver being responsive only to signals from said original transmitter; and said original receiver being substantially unmodified.

3. A remote control system according to claim 2, wherein said means for mounting said original transmitter includes a compartment in said new receiver for containing said original transmitter.

4. A remote control system according to claim 1, wherein said means for operating said original transmitter includes electrical connection from said new receiver to responsive portions of said original transmitter, whereby original functions of said original transmitter are operable directly by said new receiver, and said original receiver is thereby enabled to perform its original functions.

5. An enhancement to an original remote control system, wherein said original remote control system includes an original transmitter and an original receiver, with said original receiver being connected to perform at least a first function in response to reception of a first signal from said original transmitter, comprising:

a new receiver;

a new transmitter effective for communicating with said new receiver;

first means associated with said new receiver for controlling said original transmitter to enable performance of said at least a first function; and second means associated with said new receiver for performing at least a second function not performed by said original remote control system.

6. A system according to claim 5, wherein:

said new receiver, said original receiver and said original transmitter are mounted in a vehicle; and said original transmitter is powered from a power source of said vehicle.

* * * * *